United States Patent Office 3,784,712
Patented Jan. 8, 1974

---

3,784,712
GUM GELLING SYSTEM XANTHAN-TARA DESSERT GEL
Martin Glicksman, Valley Cottage, and Elizabeth H. Farkas, Yonkers, N.Y., assignors to General Foods Corporation, White Plains, N.Y.
No Drawing. Filed Dec. 23, 1970, Ser. No. 101,151
Int. Cl. A23l 1/04
U.S. Cl. 426—167                                    2 Claims

ABSTRACT OF THE DISCLOSURE

A thermally-reversible, room-temperature setting gel resistant to either acid degradation or syneresis upon lengthy heating is prepared from a mixture of xanthan gum and tara gum.

---

This invention relates to aqueous gels and more especially relates to edible gels of the dessert gel type and to a particular combination of gums which is soluble in water and produces such gels.

The food industry constantly is seeking out new gelling systems in order to develop new or improved food products. Individual gel systems have been found to produce a variety of different properties in their respective gels in terms of both degree and kind. Depending upon the particular properties of a given gel such as the rate and temperature at which it sets, the effect of heat and/or acid upon the gel and the physical appearance and texture of the gel, each gel may be incorporated into a number of different food products.

It is an object of this invention to provide an acid-stable, room-temperature setting, thermally-reversible dessert gel system.

It is a further object of this invention to produce such a gel system which is resistant to syneresis under conditions of either heating or freeze-thawing.

It is a more particular object of this invention to produce such a gel system from a mixture of xanthan gum and tara gum.

When effective amounts of xanthan gum are dissolved in water together with tara gum a gel develops. This is somewhat unexpected since either xanthan gum or tara gum by itself will form only viscous dispersions when dissolved in water.

The xanthan gum which is employed in this invention may be illustrated by the xanthomonas colloid produced by the bacterium *Xanthomonas campestris*. A suitable xanthan gum is commercially available under the name Keltrol from Kelco Co. The production of xanthan gum is more fully described in U.S. Pat. No. 3,507,664.

Tara gum is a vegetable gum imported from Peru and is derived from the legume seed, *Cesalpinia spinosa*.

The new gel system of this invention is unusually resistant to heat and/or acid degradation and is thus suitable for use in the formation of fruit-flavored, acid-type dessert gels. The xanthan gum-tara gum gels of this invention produce a thermally-reversible gel which is somewhat cloudy in appearance and which possesses a texture that has been described as "elastic," "rubbery" and "smooth." It is also contemplated that the gel system of this invention would be very useful in other gelled food products such as in canned puddings and dessert gels, in instant puddings and as a substitute for chemically modified starches in frozen puddings.

Xanthan gum and tara gum may be employed in the gel systems of this invention in the ratio of about 1 to 2. However, satisfactory results are achieved from weight ratios of xanthan gum to tara gum within the range of about 1 to 3 to about 3 to 1.

This invention is further described but not limited by an example of a dessert gel formulation which employs the novel gel system of this invention as follows:

|  | Grams |
|---|---|
| Sucrose | 80 |
| Xanthan gum (Keltrol) | 1.0 |
| Tara gum | 2.0 |
| Adipic acid | 2.4 |
| Fruit flavor | 0.1 |
| Fruit color | 0.1 |

The above dry mix was added to one pint (474 ml.) of cold water and brought to a boil with stirring. When the mix was dissolved the liquid was poured into a bowl and allowed to set (within 30 minutes) at room temperature. The gel was somewhat cloudy in appearance and had a smooth elastic mouthfeel with a somewhat short texture.

The final gel may be reheated and melted, and then kept hot for 5 hours. Upon cooling, it resets to a firm gel. Heating and melting may be repeated for another 5 hours and the gel will form again upon cooling.

Having thus described the invention what is claimed is:

1. An acid-stable, room-temperature setting aqueous gel containing effective amounts of a gelling system comprising xanthan gum and tara gum, the weight ratio of xanthan gum to tara gum being from about 1 to 3 to about 3 to 1.

2. The aqueous gel of claim 1 wherein the weight ratio of xanthan gum to tara gum is about 2 to 1.

References Cited

UNITED STATES PATENTS

| 3,557,016 | 1/1971 | Schuppner | 99—139 X |
| 3,507,664 | 4/1970 | Schuppner | 99—131 X |
| 2,834,774 | 5/1958 | Anker | 99—129 X |

A. LOUIS MONACELL, Primary Examiner
J. M. HUNTER, Assistant Examiner